US012602494B2

(12) United States Patent
Zhang et al.

(10) Patent No.: US 12,602,494 B2
(45) Date of Patent: Apr. 14, 2026

(54) METHOD FOR SWITCHING EXECUTION ENVIRONMENT AND RELATED DEVICE THEREOF

(71) Applicant: HUAWEI TECHNOLOGIES CO., LTD., Guangdong (CN)

(72) Inventors: Yingjun Zhang, Beijing (CN); Ji Wang, Beijing (CN); Yingliang Yao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 313 days.

(21) Appl. No.: 18/316,377

(22) Filed: May 12, 2023

(65) Prior Publication Data

US 2023/0281304 A1      Sep. 7, 2023

Related U.S. Application Data

(63) Continuation of application No. PCT/CN2021/117346, filed on Sep. 9, 2021.

(30) Foreign Application Priority Data

Nov. 13, 2020    (CN) .......................... 202011270083.8

(51) Int. Cl.
*G06F 21/60* (2013.01)
*G06F 21/53* (2013.01)
*G06F 21/55* (2013.01)
*G06F 21/56* (2013.01)

(52) U.S. Cl.
CPC ............ *G06F 21/604* (2013.01); *G06F 21/53* (2013.01); *G06F 21/554* (2013.01); *G06F 21/566* (2013.01); *G06F 2221/034* (2013.01)

(58) Field of Classification Search
None
See application file for complete search history.

(56) References Cited

U.S. PATENT DOCUMENTS 9,208,355 B1 *  12/2015  Areno ................... H04L 9/0866
9,852,084 B1 *  12/2017  Soderquist .......... G06F 12/1009
(Continued)

FOREIGN PATENT DOCUMENTS

CN          106775923 A      5/2017
CN          107506638 A      12/2017
(Continued)

OTHER PUBLICATIONS

Office Action issued in CN202011270083.8, dated Aug. 2, 2024, 9 pages.
(Continued)

*Primary Examiner* — James R Turchen

(57) ABSTRACT

The present disclosure discloses a method for switching an execution environment and a related device thereof, to effectively prevent a hacker from maliciously accessing a TEE through ATF. The method in the present disclosure includes: After writing a first virtual address into a return address register of the TEE, the ATF determines whether the first virtual address is within a valid address range, and switches to the TEE based on the first virtual address only when determining that the first virtual address is within the valid address range.

12 Claims, 5 Drawing Sheets

(56)               References Cited

U.S. PATENT DOCUMENTS

| 2003/0200402 | A1* | 10/2003 | Willman | G06F 12/145 |
| | | | | 711/202 |
| 2005/0160210 | A1* | 7/2005 | Watt | G06F 9/4812 |
| | | | | 710/269 |
| 2007/0050586 | A1* | 3/2007 | Shin | G06F 12/1466 |
| | | | | 711/163 |
| 2016/0125186 | A1* | 5/2016 | Francois | G06F 21/57 |
| | | | | 726/1 |
| 2016/0364341 | A1* | 12/2016 | Banginwar | G06F 9/485 |
| 2020/0143041 | A1* | 5/2020 | Jung | G06F 21/71 |
| 2023/0198759 | A1* | 6/2023 | Shim | H04L 9/0897 |
| | | | | 713/193 |

FOREIGN PATENT DOCUMENTS

| CN | 111858004 A | 10/2020 | | |
| WO | WO-2019192344 A1 * | 10/2019 | | G06F 21/74 |

OTHER PUBLICATIONS

International Search Report and Written Opinion issued in PCT/CN2021/117346, dated Dec. 3, 2021, 10 pages.

Extended European Search Report issued in EP21890775.6, dated Jul. 24, 2024, 10 pages.

* cited by examiner

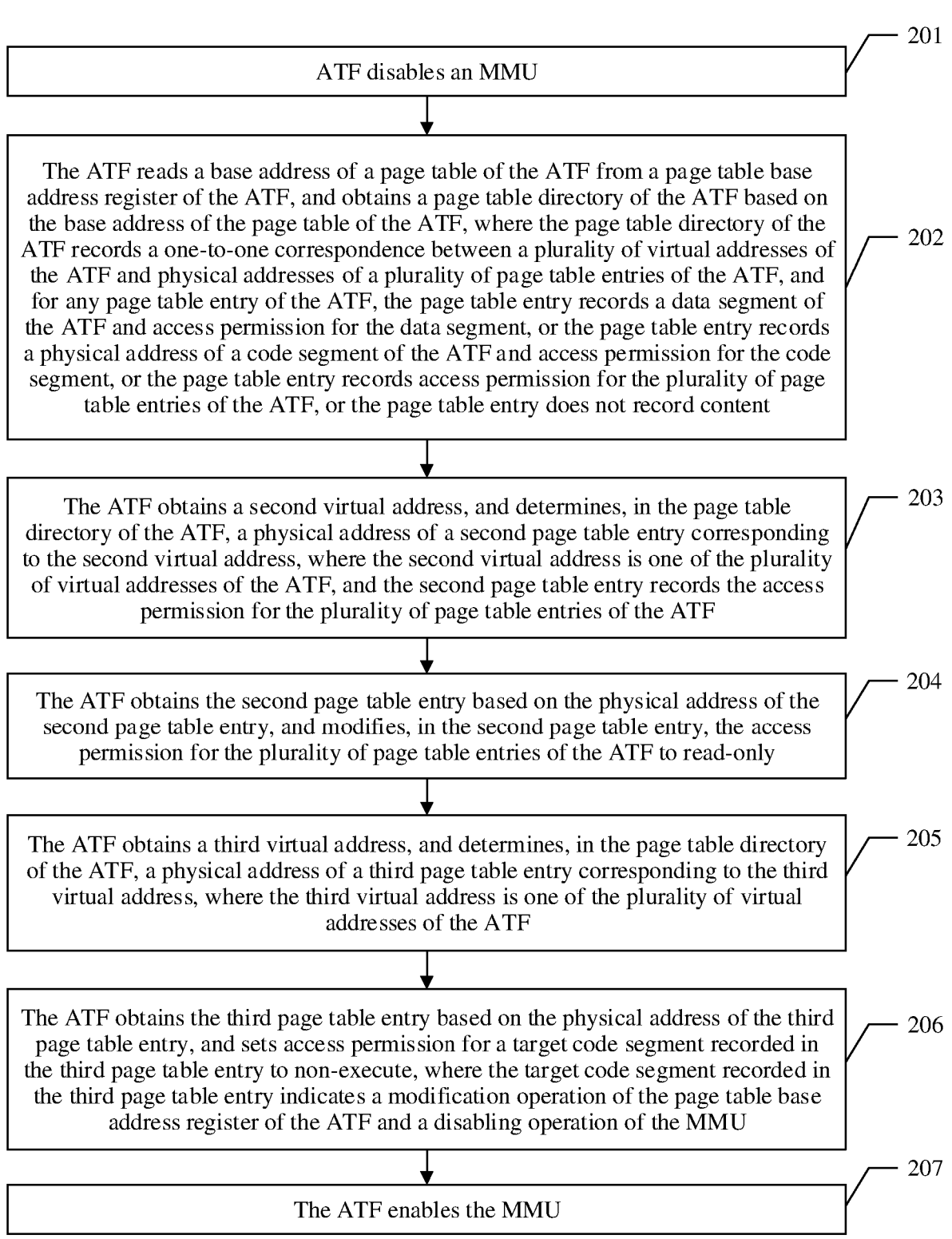

ATF disables an MMU ⸺ 201

The ATF reads a base address of a page table of the ATF from a page table base address register of the ATF, and obtains a page table directory of the ATF based on the base address of the page table of the ATF, where the page table directory of the ATF records a one-to-one correspondence between a plurality of virtual addresses of the ATF and physical addresses of a plurality of page table entries of the ATF, and for any page table entry of the ATF, the page table entry records a data segment of the ATF and access permission for the data segment, or the page table entry records a physical address of a code segment of the ATF and access permission for the code segment, or the page table entry records access permission for the plurality of page table entries of the ATF, or the page table entry does not record content ⸺ 202

The ATF obtains a second virtual address, and determines, in the page table directory of the ATF, a physical address of a second page table entry corresponding to the second virtual address, where the second virtual address is one of the plurality of virtual addresses of the ATF, and the second page table entry records the access permission for the plurality of page table entries of the ATF ⸺ 203

The ATF obtains the second page table entry based on the physical address of the second page table entry, and modifies, in the second page table entry, the access permission for the plurality of page table entries of the ATF to read-only ⸺ 204

The ATF obtains a third virtual address, and determines, in the page table directory of the ATF, a physical address of a third page table entry corresponding to the third virtual address, where the third virtual address is one of the plurality of virtual addresses of the ATF ⸺ 205

The ATF obtains the third page table entry based on the physical address of the third page table entry, and sets access permission for a target code segment recorded in the third page table entry to non-execute, where the target code segment recorded in the third page table entry indicates a modification operation of the page table base address register of the ATF and a disabling operation of the MMU ⸺ 206

The ATF enables the MMU ⸺ 207

FIG. 2

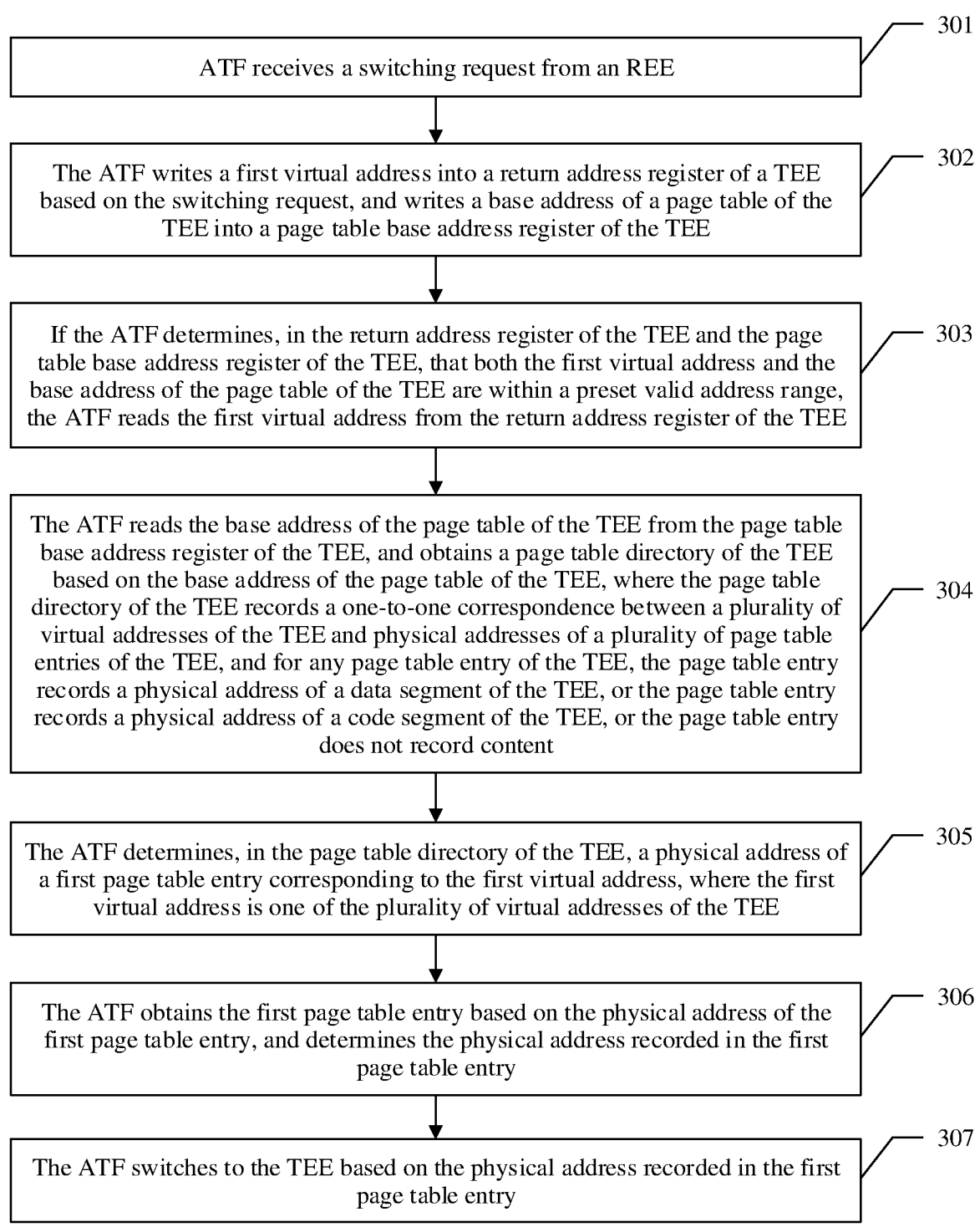

ATF receives a switching request from an REE — 301

The ATF writes a first virtual address into a return address register of a TEE based on the switching request, and writes a base address of a page table of the TEE into a page table base address register of the TEE — 302

If the ATF determines, in the return address register of the TEE and the page table base address register of the TEE, that both the first virtual address and the base address of the page table of the TEE are within a preset valid address range, the ATF reads the first virtual address from the return address register of the TEE — 303

The ATF reads the base address of the page table of the TEE from the page table base address register of the TEE, and obtains a page table directory of the TEE based on the base address of the page table of the TEE, where the page table directory of the TEE records a one-to-one correspondence between a plurality of virtual addresses of the TEE and physical addresses of a plurality of page table entries of the TEE, and for any page table entry of the TEE, the page table entry records a physical address of a data segment of the TEE, or the page table entry records a physical address of a code segment of the TEE, or the page table entry does not record content — 304

The ATF determines, in the page table directory of the TEE, a physical address of a first page table entry corresponding to the first virtual address, where the first virtual address is one of the plurality of virtual addresses of the TEE — 305

The ATF obtains the first page table entry based on the physical address of the first page table entry, and determines the physical address recorded in the first page table entry — 306

The ATF switches to the TEE based on the physical address recorded in the first page table entry — 307

FIG. 3

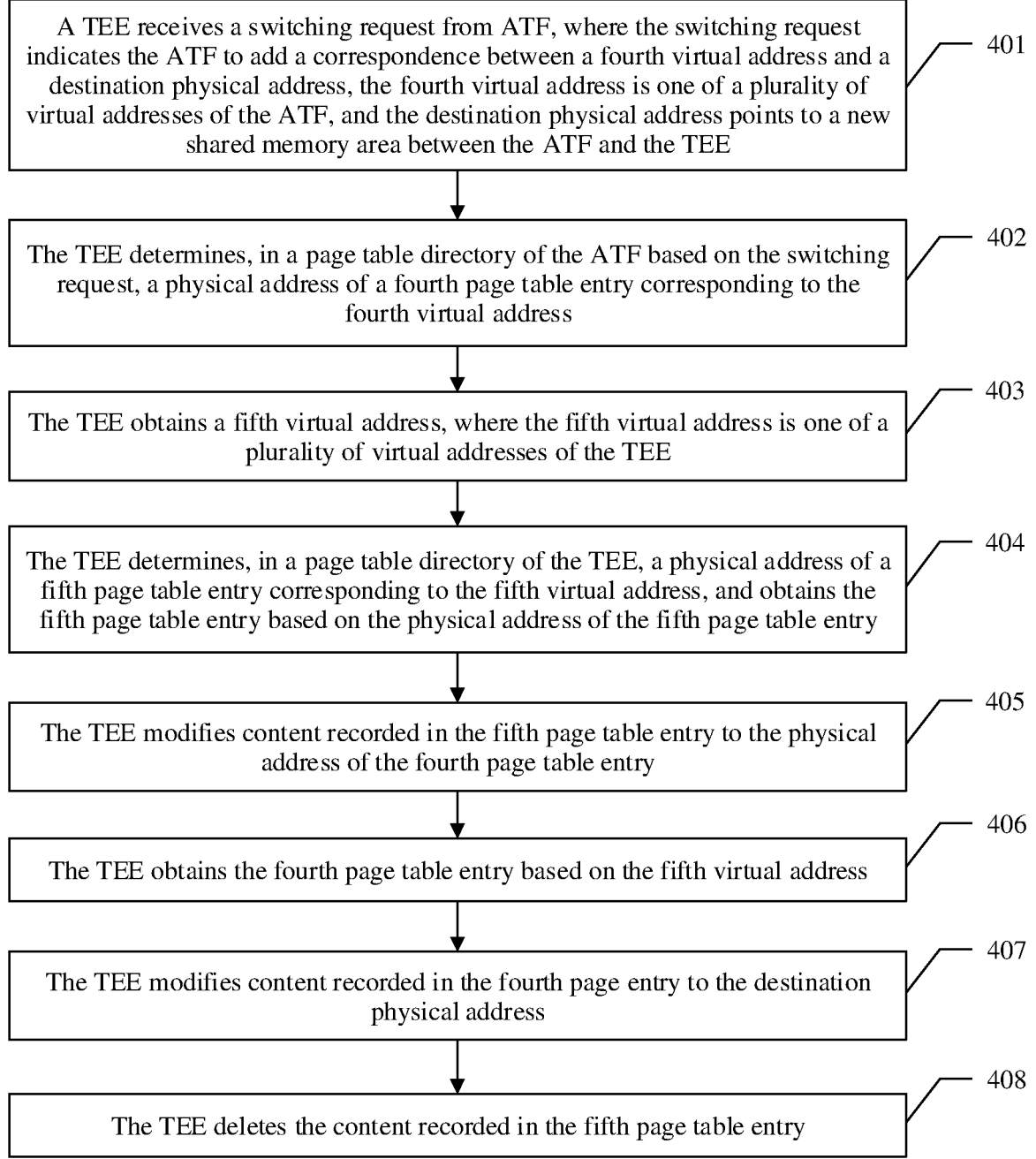

A TEE receives a switching request from ATF, where the switching request indicates the ATF to add a correspondence between a fourth virtual address and a destination physical address, the fourth virtual address is one of a plurality of virtual addresses of the ATF, and the destination physical address points to a new shared memory area between the ATF and the TEE ⟋— 401

The TEE determines, in a page table directory of the ATF based on the switching request, a physical address of a fourth page table entry corresponding to the fourth virtual address ⟋— 402

The TEE obtains a fifth virtual address, where the fifth virtual address is one of a plurality of virtual addresses of the TEE ⟋— 403

The TEE determines, in a page table directory of the TEE, a physical address of a fifth page table entry corresponding to the fifth virtual address, and obtains the fifth page table entry based on the physical address of the fifth page table entry ⟋— 404

The TEE modifies content recorded in the fifth page table entry to the physical address of the fourth page table entry ⟋— 405

The TEE obtains the fourth page table entry based on the fifth virtual address ⟋— 406

The TEE modifies content recorded in the fourth page entry to the destination physical address ⟋— 407

The TEE deletes the content recorded in the fifth page table entry ⟋— 408

FIG. 4

METHOD FOR SWITCHING EXECUTION ENVIRONMENT AND RELATED DEVICE THEREOF

CROSS-REFERENCE TO RELATED APPLICATIONS

This application is a continuation of International Application No. PCT/CN2021/117346, filed on Sep. 9, 2021, which claims priority to Chinese Patent Application No. 202011270083.8, filed on Nov. 13, 2020. The disclosures of the aforementioned applications are hereby incorporated by reference in their entireties.

TECHNICAL FIELD

The present disclosure relates to the field of security technologies, and in particular, to a method for switching an execution environment and a related device thereof.

BACKGROUND

With rapid development of internet technologies and intelligent terminals, a requirement on a security level of a running environment of the intelligent terminal is increasingly high. A trust zone (TrustZone) has gradually become a standard configuration of the intelligent terminal. Trust-Zone is a security technology proposed by the ARM company. In the TrustZone, a monitoring mode is introduced, and there is a trust execution environment (TEE) and a rich execution environment (REE) in the monitoring mode. The TEE and the REE each have specific execution space. The TEE has a higher security level than the REE, and software and hardware resources that can be accessed by the TEE are separated from those accessed by the REE. Rich operating systems (Rich OS) such as Android and Linux and an upper-layer common application may be run in the REE; and the TEE may provide a secure execution environment for a trusted application (TA), and also protect confidentiality, integrity, and access permission for resources and data of the TA.

Generally, a layer of component, such as ARM trusted firmware (ATF), is disposed between the TEE and the REE. When it is ensured that the REE and the TEE are isolated, the ATF is generally responsible for communication and switching between the TEE and the REE. The ATF has highest processor execution permission and can access sensitive code and critical assets of the TEE. However, the ATF is not a component designed for security, and has a weak security defense capability. Consequently, the ATF often becomes an attack target of a hacker. The hacker further attacks the TEE by breaking through the ATF, to obtain critical assets of a user.

When the ATF needs to implement switching between the REE and the TEE, the ATF may write an entrance address (namely, a virtual address used to enter the TEE) of the TEE into a return address register of the TEE, read the address from the return address register of the TEE, and switch to the TEE based on the address, so that code corresponding to the address and subsequent code start to be executed in the TEE. In the foregoing switching process, if the hacker breaks through the ATF, the hacker may write an invalid entrance address into the return address register of the TEE through the ATF. Consequently, transferring from code of the ATF to any code in the TEE for execution is performed based on the invalid entrance address. For example, after switching to the TEE is performed, the TEE skips some critical security verification steps, and directly returns a result of successful verification to the REE. Therefore, how to prevent the hacker from maliciously accessing the TEE through the ATF becomes an urgent technical problem that needs to be resolved.

SUMMARY

Embodiments of the present disclosure provide a method for switching an execution environment and a related device thereof, to effectively prevent a hacker from maliciously accessing a TEE through ATF.

A first aspect of embodiments of the present disclosure provides a method for switching an execution environment. The method includes:

when switching from an REE to a TEE needs to be performed, the REE may initiate a switching request to ATF. After receiving the switching request from the REE, the ATF may determine that switching between the REE and the TEE needs to be performed. Then, the ATF writes a first virtual address (namely, an entrance address of the TEE) into a return address register of the TEE based on the switching request. Then, the ATF determines whether the first virtual address in the register is within a preset valid address range. For example, if the preset valid address range includes only one valid entrance address, it is equivalent to that a unique entrance address used to enter the TEE is set. Therefore, the ATF can switch to the TEE only based on the unique entrance address. For another example, if the preset valid address range includes a plurality of valid entrance addresses, the ATF may switch to the TEE based on one of the entrance addresses. Finally, if the ATF determines that the first virtual address in the return address register of the TEE is within the preset valid address range, the ATF reads the first virtual address from the return address register of the TEE, and switches to the TEE based on the first virtual address, so that code corresponding to the first virtual address and subsequent code start to be executed in the TEE, to implement switching between the REE and the TEE.

It can be learned from the foregoing method that, after receiving the switching request of the REE, the ATF may write the first virtual address into the return address register of the TEE. After determining that the first virtual address in the register is within the preset valid address range, the ATF reads the first virtual address from the return address register of the TEE, and switches to the TEE based on the first virtual address. Because the first virtual address is within the preset valid address range, in other words, a value of the first virtual address can be obtained only within the preset valid address range, the ATF switches to the TEE based on the first virtual address whose value is limited, so that code only at a specific location and subsequent code start to be executed in the TEE, and it is equivalent to that the ATF can enter the TEE only from a specific entrance or some specific entrances. This can effectively prevent a hacker from maliciously accessing the TEE through the ATF.

In a possible implementation, the method further includes: writing a base address of a page table of the TEE into a page table base address register of the TEE. That the ATF reads the first virtual address from the return address register of the TEE if the ATF determines that the first virtual address in the return address register of the TEE is within a valid address range includes: If the ATF determines, in the return address register of the TEE and the page table base address register of the TEE, that both the first virtual address and the base address of the page table of the TEE are within the preset valid address range, the ATF reads the first virtual address from the return address register of the TEE. In the foregoing implementation, after receiving the switching request, the ATF may respectively write the first virtual address and the base address of the page table of the TEE into the return address register of the TEE and the page table base address register of the TEE. Before writing the addresses, the ATF may be attacked by a hacker, to write invalid addresses to the two registers (write the invalid address into the return address register, causing a case in which the TEE is entered without using a valid entrance address, and write the invalid address into the page table base address register of the TEE, causing a case in which the TEE uses an invalid page table), and consequently the hacker maliciously accesses the TEE through the ATF. Therefore, after the ATF respectively writes the addresses into the two registers, the ATF may detect values that are in the two registers. If both the first virtual address and the base address of the page table of the TEE are within the preset valid address range, that is, both the first virtual address and the base address of the page table of the TEE are valid addresses, it indicates that the ATF is not attacked by a hacker. Therefore, the ATF may obtain the first virtual address from the return address register of the TEE, to securely switch to the TEE based on the first virtual address.

In a possible implementation, that the ATF switches to the TEE based on the first virtual address includes: The ATF reads the base address of the page table of the TEE from the page table base address register of the TEE, and obtains a page table directory of the TEE based on the base address of the page table of the TEE, where the page table directory of the TEE records a one-to-one correspondence between a plurality of virtual addresses of the TEE and physical addresses of a plurality of page table entries of the TEE, and for any page table entry of the TEE, the page table entry records a physical address of a data segment of the TEE, or the page table entry records a physical address of a code segment of the TEE, or the page table entry does not record content. The ATF determines, in the page table directory of the TEE, a physical address of a first page table entry corresponding to the first virtual address, where the first virtual address is one of the plurality of virtual addresses of the TEE. The ATF obtains the first page table entry based on the physical address of the first page table entry, and determines the physical address recorded in the first page table entry. The ATF switches to the TEE based on the physical address recorded in the first page table entry. In the foregoing implementation, because the base address of the page table of the TEE is also a valid address, the ATF may obtain the correct page directory of the TEE based on the address, so as to obtain, from the page directory of the TEE based on the first virtual address, the physical address recorded in the first page table entry. The physical address points to code corresponding to an entrance location of the TEE. In this case, the ATF may switch to the TEE based on the physical address, so that the code corresponding to physical address and subsequent code start to be executed in the TEE.

In a possible implementation, before the ATF receives the switching request from the REE, the method further includes: The ATF disables a memory management unit (MMU). The ATF reads a base address of a page table of the ATF from a page table base address register of the ATF, and obtains a page table directory of the ATF based on the base address of the page table of the ATF. The page table directory of the ATF records a one-to-one correspondence between a plurality of virtual addresses of the ATF and physical addresses of a plurality of page table entries of the ATF. For any page table entry of the ATF, the page table entry records a data segment of the ATF and access permission for the data segment, or the page table entry records a physical address of a code segment of the ATF and access permission for the code segment, or the page table entry records access permission for the plurality of page table entries of the ATF, or the page table entry does not record content. The ATF obtains a second virtual address, and determines, in the page table directory of the ATF, a physical address of a second page table entry corresponding to the second virtual address, where the second virtual address is one of the plurality of virtual addresses of the ATF, and the second page table entry records the access permission for the plurality of page table entries of the ATF. The ATF obtains the second page table entry based on the physical address of the second page table entry, and modifies, in the second page table entry, the access permission for the plurality of page table entries of the ATF to read-only. The ATF obtains a third virtual address, and determines, in the page table directory of the ATF, a physical address of a third page table entry corresponding to the third virtual address, where the third virtual address is one of the plurality of virtual addresses of the ATF. The ATF obtains the third page table entry based on the physical address of the third page table entry, and sets access permission for a target code segment recorded in the third page table entry to non-execute, where the target code segment indicates a modification operation of the page table base address register of the ATF and a disabling operation of the MMU. The ATF enables the MMU. In a conventional technology, if ATF is attacked by a hacker, the hacker may modify, through the ATF, a physical address recorded in a page table entry of the ATF, to enable the page table entry of the ATF to be mapped to a memory of the TEE (where if the physical address recorded in the page table entry of the ATF is not maliciously modified, a target memory to which the page table entry of the ATF is mapped is usually the memory of the ATF), so as to steal or tamper with data and code of the TEE. Further, the hacker may further write an invalid base address into a page table base address register of the ATF through the ATF, to enable the ATF to obtain a page table directory and a page table entry that are maliciously created by the hacker. Because a physical address recorded in the page table entry created by the hacker usually points to the memory of the TEE, the hacker may also steal or tamper with the data and the code of the TEE in this attack manner. In the foregoing implementation, the ATF may first disable the MMU, then modify access permission for all page table entries of the ATF to read-only, modify code of sensitive instructions (including the modification operation of the page table address register of the ATF and the disabling operation of the MMU) to non-execute, and finally restart the MMU. Because the access permission for the page table entry of the ATF is set to read-only, and the MMU cannot be disabled anymore (because when the MMU is in an enabled state, if the access permission for the page table entry of the ATF and the access permission for the sensitive code are forcibly modified, a system crashes), even if the ATF is attacked by a hacker, the hacker cannot modify the page table entry of the ATF through the ATF, and cannot access the memory of the TEE. Further, because a value in the page table address register of the ATF cannot be modified, the hacker cannot write an invalid base address into the page table address register of the ATF, and cannot perform mapping to the memory of the TEE by using the invalid page table and access the memory of the TEE. This can further prevent the hacker from maliciously accessing the TEE through the ATF.

In a possible implementation, if the switching request indicates the ATF to add a correspondence between a fourth virtual address and a destination physical address, where the fourth virtual address is one of a plurality of virtual addresses of the ATF, and the destination physical address points to a new shared memory area between the ATF and the TEE, after the ATF is switched to the TEE based on the first virtual address, the method further includes: The TEE receives the switching request from the ATF. The TEE determines, in a page table directory of the ATF based on the switching request, a physical address of a fourth page table entry corresponding to the fourth virtual address, where the page table directory of the ATF records a one-to-one correspondence between the plurality of virtual addresses of the ATF and physical addresses of a plurality of page table entries of the ATF. The TEE obtains a fifth virtual address, where the fifth virtual address is one of the plurality of virtual addresses of the TEE. The TEE determines, in the page table directory of the TEE, a physical address of a fifth page table entry corresponding to the fifth virtual address, and obtains the fifth page table entry based on the physical address of the fifth page table entry. The TEE modifies content recorded in the fifth page table entry to the physical address of the fourth page table entry. The TEE obtains the fourth page table entry based on the fifth virtual address. The TEE modifies content recorded in the fourth page table entry to the destination physical address. In the foregoing implementation, if the switching request sent by the REE in some special service scenarios indicates the ATF to extend memory access permission for the ATF (where generally, the switching request indicates the ATF to extend access permission for a new shared memory), in other words, indicates the ATF to add the correspondence between the fourth virtual address (one of the plurality of virtual addresses of the ATF) and the destination physical address (pointing to the new shared memory area), because the page table entry of the ATF has been locked (the page table entry of the ATF can only be read), the ATF cannot modify the fourth page table entry corresponding to the fourth virtual address, but the TEE may map the fifth virtual address (one of the plurality of virtual addresses of the TEE) to the fourth page table entry. Therefore, the TEE may obtain the fourth page table entry based on the fifth virtual address, to modify the content recorded in the fourth page table entry to the destination physical address. In this way, a correspondence between the fourth virtual address and the destination physical address is established, so that the solution is more comprehensive.

It should be noted that the method performed by the TEE may also be independently used as a method provided in another aspect of the present disclosure.

In a possible implementation, before the ATF writes the first virtual address into the return address register of the TEE, the method further includes: The ATF modifies a value of a system control register, to enable the ATF to be in an interrupt disable state. In the foregoing implementation, before writing addresses into the two registers, the ATF may first enter the interrupt disable state, so as to prevent subsequent steps from being interrupted by an interrupt event.

In a possible implementation, after the TEE modifies the content recorded in the fourth page table entry to the destination physical address, the method further includes: The TEE deletes the content recorded in the fifth page table entry. In the foregoing implementation, after establishing the correspondence between the fourth virtual address and the destination physical address, the TEE may remove a correspondence between the fifth virtual address and the fourth page table entry.

It should be understood that the foregoing method may be implemented by one module, or may be implemented by a plurality of modules in collaboration.

According to a second aspect of embodiments of the present disclosure, a method for switching an execution environment is provided. The method includes: before ATF receives a switching request from an REE, the method further includes: The ATF disables a memory management unit (MMU). The ATF reads a base address of a page table of the ATF from a page table base address register of the ATF, and obtains a page table directory of the ATF based on the base address of the page table of the ATF. The page table directory of the ATF records a one-to-one correspondence between a plurality of virtual addresses of the ATF and physical addresses of a plurality of page table entries of the ATF. For any page table entry of the ATF, the page table entry records a data segment of the ATF and access permission for the data segment, or the page table entry records a physical address of a code segment of the ATF and access permission for the code segment, or the page table entry records access permission for the plurality of page table entries of the ATF, or the page table entry does not record content. The ATF obtains a second virtual address, and determines, in the page table directory of the ATF, a physical address of a second page table entry corresponding to the second virtual address, where the second virtual address is one of the plurality of virtual addresses of the ATF, and the second page table entry records the access permission for the plurality of page table entries of the ATF. The ATF obtains the second page table entry based on the physical address of the second page table entry, and modifies, in the second page table entry, the access permission for the plurality of page table entries of the ATF to read-only. The ATF obtains a third virtual address, and determines, in the page table directory of the ATF, a physical address of a third page table entry corresponding to the third virtual address, where the third virtual address is one of the plurality of virtual addresses of the ATF. The ATF obtains the third page table entry based on the physical address of the third page table entry, and sets access permission for a target code segment recorded in the third page table entry to non-execute, where the target code segment indicates a modification operation of the page table base address register of the ATF and a disabling operation of the MMU. The ATF enables the MMU.

In a conventional technology, if ATF is attacked by a hacker, the hacker may modify, through the ATF, a physical address recorded in a page table entry of the ATF, to enable the page table entry of the ATF to be mapped to a memory of the TEE (where if the physical address recorded in the page table entry of the ATF is not maliciously modified, a target memory to which the page table entry of the ATF is mapped is usually the memory of the ATF), so as to steal or tamper with data and code of the TEE. Further, the hacker may further write an invalid base address into a page table base address register of the ATF through the ATF, to enable the ATF to obtain a page table directory and a page table entry that are maliciously created by the hacker. Because a physical address recorded in the page table entry created by the hacker usually points to the memory of the TEE, the hacker may also steal or tamper with the data and the code of the TEE in this attack manner.

It can be learned from the foregoing method that, the ATF may first disable the MMU, then modify access permission for all page table entries of the ATF to read-only, modify code of sensitive instructions (including the modification operation of the page table address register of the ATF and the disabling operation of the MMU) to non-execute, and finally restart the MMU. Because the access permission for the page table entry of the ATF is set to read-only, and the MMU cannot be disabled anymore (because when the MMU is in an enabled state, if the access permission for the page table entry of the ATF and the access permission for the sensitive code are forcibly modified, a system crashes), even if the ATF is attacked by a hacker, the hacker cannot modify the page table entry of the ATF through the ATF, and cannot access the memory of the TEE. Further, because a value in the page table address register of the ATF cannot be modified, the hacker cannot write an invalid base address into the page table address register of the ATF, and cannot perform mapping to the memory of the TEE by using an invalid page table and access the memory of the TEE. This can further prevent the hacker from maliciously accessing the TEE through the ATF.

According to a third aspect of embodiments of the present disclosure, an apparatus for switching an execution environment is provided. The apparatus includes an REE, ATF, and a TEE. The ATF is configured to: receive a switching request from the REE; write a first virtual address into a return address register of the TEE based on the switching request; read the first virtual address from the return address register of the TEE if the ATF determines that the first virtual address in the return address register of the TEE is within a preset valid address range; and switch to the TEE based on the first virtual address.

It can be learned from the foregoing apparatus that, after receiving the switching request of the REE, the ATF may write the first virtual address into the return address register of the TEE. After determining that the first virtual address in the register is within the preset valid address range, the ATF reads the first virtual address from the return address register of the TEE, and switches to the TEE based on the first virtual address. Because the first virtual address is within the preset valid address range, in other words, a value of the first virtual address can be obtained only within the preset valid address range, the ATF switches to the TEE based on the first virtual address whose value is limited, so that code only at a specific location and subsequent code start to be executed in the TEE, and it is equivalent to that the ATF can enter the TEE only from a specific entrance or some specific entrances. This can effectively prevent a hacker from maliciously accessing the TEE through the ATF.

In a possible implementation, the ATF is further configured to write a base address of a page table of the TEE into a page table base address register of the TEE. The ATF is configured to: if determining, in the return address register of the TEE and the page table base address register of the TEE, that both the first virtual address and the base address of the page table of the TEE are within the preset valid address range, read the first virtual address from the return address register of the TEE.

In a possible implementation, the ATF is further configured to: read the base address of the page table of the TEE from the page table base address register of the TEE, and obtain a page table directory of the TEE based on the base address of the page table of the TEE, where the page table directory of the TEE records a one-to-one correspondence between a plurality of virtual addresses of the TEE and physical addresses of a plurality of page table entries of the TEE, and for any page table entry of the TEE, the page table entry records a physical address of a data segment of the TEE, or the page table entry records a physical address of a code segment of the TEE, or the page table entry does not record content; determine, in the page table directory of the TEE, a physical address of a first page table entry corresponding to the first virtual address, where the first virtual address is one of the plurality of virtual addresses of the TEE; obtain the first page table entry based on the physical address of the first page table entry, and determine the physical address recorded in the first page table entry; and switch to the TEE based on the physical address recorded in the first page table entry.

In a possible implementation, if the switching request indicates the ATF to add a correspondence between a fourth virtual address and a destination physical address, where the fourth virtual address is one of a plurality of virtual addresses of the ATF, and the destination physical address points to a new shared memory area between the ATF and the TEE, the TEE is configured to: receive the switching request from the ATF; determine, in a page table directory of the ATF based on the switching request, a physical address of a fourth page table entry corresponding to the fourth virtual address, where the page table directory of the ATF records a one-to-one correspondence between the plurality of virtual addresses of the ATF and physical addresses of a plurality of page table entries of the ATF; obtain a fifth virtual address, and determine, in the page table directory of the TEE, a physical address of a fifth page table entry corresponding to the fifth virtual address, where the fifth virtual address is one of the plurality of virtual addresses of the TEE; obtain the fifth page table entry based on the physical address of the fifth page table entry, and modify content recorded in the fifth page table entry to the physical address of the fourth page table entry; obtain the fourth page table entry based on the fifth virtual address; and modify content recorded in the fourth page table entry to the destination physical address.

In a possible implementation, the ATF is further configured to modify a value of a system control register, to enable the ATF to be in an interrupt disable state.

In a possible implementation, the TEE is further configured to delete the content recorded in the fifth page table entry.

A fourth aspect of embodiments of the present disclosure provides an apparatus for switching an execution environment. The apparatus includes ATF, and the ATF is configured to: disable an MMU; read a base address of a page table of the ATF from a page table base address register of the ATF, and obtain a page table directory of the ATF based on the base address of the page table of the ATF, where the page table directory of the ATF records a one-to-one correspondence between a plurality of virtual addresses of the ATF and physical addresses of a plurality of page table entries of the ATF, and for any page table entry of the ATF, the page table entry records a data segment of the ATF and access permission for the data segment, the page table entry records a physical address of a code segment of the ATF and access permission for the code segment, or the page table entry records access permission for the plurality of page table entries of the ATF, or the page table entry does not record content; obtain a second virtual address, and determine, in the page table directory of the ATF, a physical address of a second page table entry corresponding to the second virtual address, where the second virtual address is one of the plurality of virtual addresses of the ATF, and the second page table entry records the access permission for the plurality of page table entries of the ATF; obtain a second page table entry based on the physical address of the second page table entry, and modify, in the second page table entry, the access permission for the plurality of page table entries of the ATF to read-only; obtain a third virtual address, and determine, in the page table directory of the ATF, a physical address of a third page table entry corresponding to the third virtual address, where the third virtual address is one of the plurality of virtual addresses of the ATF; obtain the third page table entry based on the physical address of the third page table entry, and set access permission for a target code segment recorded in the third page table entry to non-execute, where the target code segment indicates a modification operation of the page table base address register of the ATF and a disabling operation of the MMU; and enable the MMU.

It can be learned from the foregoing apparatus that, the ATF may first disable the MMU, then modify access permission for all page table entries of the ATF to read-only, modify code of sensitive instructions (including the modification operation of the page table address register of the ATF and the disabling operation of the MMU) to non-execute, and finally restart the MMU. Because the access permission for the page table entry of the ATF is set to read-only, and the MMU cannot be disabled anymore (because when the MMU is in an enabled state, if the access permission for the page table entry of the ATF and the access permission for the sensitive code are forcibly modified, a system crashes), even if the ATF is attacked by a hacker, the hacker cannot modify the page table entry of the ATF through the ATF, and cannot access the memory of the TEE. Further, because a value in the page table address register of the ATF cannot be modified, the hacker cannot write an invalid base address into the page table address register of the ATF, and cannot perform mapping to the memory of the TEE by using the invalid page table and access the memory of the TEE. This can further prevent the hacker from maliciously accessing the TEE through the ATF.

A fifth aspect of embodiments of the present disclosure provides a terminal device. The terminal device includes a processor and a memory. The memory is configured to store computer-executable instructions. The processor is configured to execute the computer-executable instructions stored in the memory, so that the terminal device implements the method according to any one of the first aspect, the possible implementations of the first aspect, or the second aspect.

A sixth aspect of embodiments of the present disclosure provides a computer storage medium, including computer-readable instructions. When the computer-readable instructions are executed, the method according to any one of the first aspect, the possible implementations of the first aspect, or the second aspect is implemented.

A seventh aspect of embodiments of the present disclosure provides a computer program product including instructions. When the computer program product runs on a computer, the computer is enabled to perform the method according to any one of the first aspect, the possible implementations of the first aspect, or the second aspect. It should be understood that the method performed by the TEE may be used as another computer program product.

An eighth aspect of embodiments of the present disclosure provides a chip system. The chip system includes one or more processors and a storage medium, and the storage medium stores computer-readable instructions. After the one or more processors read the computer-readable instructions, the chip system is enabled to implement any one of the first aspect, the second aspect, or the implementations thereof.

In embodiments of the present disclosure, after receiving the switching request of the REE, the ATF may write the first virtual address into the return address register of the TEE. After determining that the first virtual address in the register is within the preset valid address range, the ATF reads the first virtual address from the return address register of the TEE, and switches to the TEE based on the first virtual address. Because the first virtual address is within the preset valid address range, in other words, the value of the first virtual address can be obtained only within the preset valid address range, the ATF switches to the TEE based on the first virtual address whose value is limited, so that the code only at the specific location and subsequent code start to be executed in the TEE, and it is equivalent to that the ATF can enter the TEE only from the specific entrance or some specific entrances. This can effectively prevent a hacker from maliciously accessing the TEE through the ATF.

BRIEF DESCRIPTION OF DRAWINGS

FIG. 2 is a schematic flowchart of a method for switching an execution environment according to an embodiment of the present disclosure;

FIG. 3 is another schematic flowchart of a method for switching an execution environment according to an embodiment of the present disclosure;

FIG. 4 is still another schematic flowchart of a method for switching an execution environment according to an embodiment of the present disclosure;

DESCRIPTION OF EMBODIMENTS

The following describes in detail technical solutions in embodiments of the present disclosure with reference to the accompanying drawings in embodiments of the present disclosure.

In the present disclosure, claims, and accompanying drawings of the present disclosure, the terms "first", "second", and the like are intended to distinguish between similar objects but do not necessarily indicate a specific order or sequence. It should be understood that the data termed in such a way are interchangeable in proper circumstances, so that embodiments described herein can be implemented in other orders than the order illustrated or described herein. In addition, the terms "include", "contain" and any other variants mean to cover the non-exclusive inclusion, for example, a process, method, system, product, or device that includes a list of steps or modules is not necessarily limited to those steps or modules, but may include other steps or modules not expressly listed or inherent to such a process, method, system, product, or device. Names or numbers of steps in the present disclosure do not mean that the steps in the method procedure need to be performed in a time/logical sequence indicated by the names or numbers. An execution sequence of the steps in the procedure that have been named or numbered can be changed based on a technical objective to be achieved, provided that same or similar technical effects can be achieved. Division into the modules in the present disclosure is logical division. In actual application, there may be another division manner. For example, a plurality of modules may be combined or integrated into another system, or some features may be ignored or not performed. In addition, the displayed or discussed mutual coupling or direct coupling or communication connection may be through some ports, and the indirect coupling or communication connection between modules may be in an electrical form or another similar form. This is not limited in the present disclosure. In addition, modules or sub-modules described as separate components may be or may not be physically separated, or may be or may not be physical modules, or may not be grouped into a plurality of circuit modules. Objectives of the solutions of the present disclosure may be achieved by selecting some or all of the modules based on an actual requirement.

Figure 1:
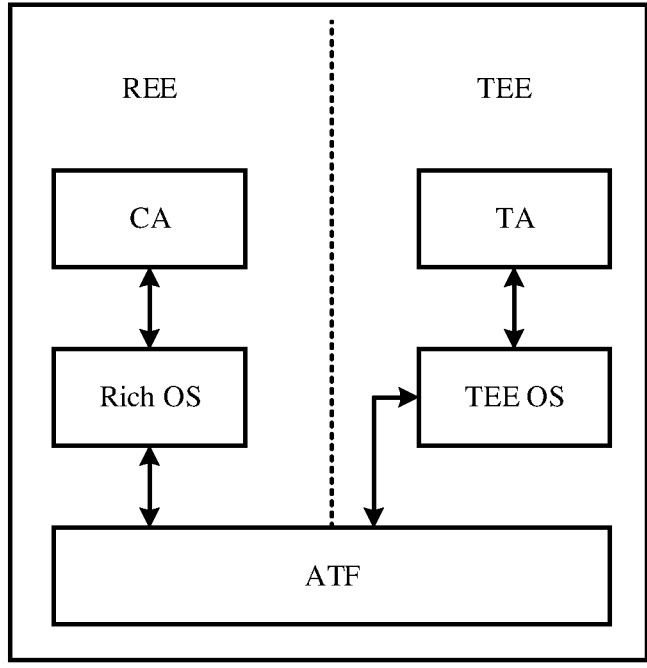
FIG. 1 is a schematic diagram of a software structure of a terminal device according to an embodiment of the present disclosure.

Embodiments of the present disclosure may be implemented by using a terminal device. The terminal device may be a device such as a smartphone, a personal digital assistant (PDA), or a tablet computer. The following briefly describes a software architecture of a terminal device. FIG. 1 is a schematic diagram of a software structure of a terminal device according to an embodiment of the present disclosure. As shown in FIG. 1, a non-secure running environment and a secure running environment may be deployed on the terminal device. The non-secure running environment is an REE on the terminal device, and a currently commonly used rich operating system (namely, a Rich OS in FIG. 1), for example, an operating system such as Android, IOS, or WindowsPhone may run in the REE. The secure running environment is a TEE on the terminal device. A secure operating system (namely, a TEE OS in FIG. 1) that has a simple function and a small code amount, that is closed, and that can be manually reviewed and controlled may run in the TEE. A client application (CA) having a low security requirement runs in the REE; and a secure application TA having a high security requirement runs in the TEE, and may provide a security service for the CA deployed in the Rich OS. For example, when a user uses the CA on the terminal device, if a sensitive operation such as electronic payment is to be performed, the CA sends a request to the TA. After receiving the request, the TA performs a payment-related verification operation (for example, verifies whether a password is correct), and returns a verification success result to the CA. The CA continues to perform subsequent steps to prevent data (for example, the password described above) from being disclosed.

Generally, software and hardware resources that can be accessed by the TEE are isolated from the REE. The TEE may provide a secure service for the REE, but the TEE and the REE are securely isolated. The Rich OS in the REE and the CA in the Rich OS cannot directly access the TEE. Therefore, the TEE constructs a secure running environment isolated from the REE, to provide a secure execution environment for the TA. A layer of underlying firmware is disposed between the REE and the TEE, and the underlying firmware is usually presented in a form of ATF. The ATF may implement communication and switching between the REE and the TEE while ensuring isolation between the REE and the TEE. The ATF has highest processor execution permission and can access memories of the REE and the TEE. Consequently, the ATF is vulnerable to attacks. In addition, the ATF is not a component specially designed for security, and can implement fewer security mechanisms than the TEE. As a result, the ATF has a weak security defense capability. In this way, the ATF often becomes an attack target of a hacker. The hacker further attacks the TEE by breaking through the ATF, to steal critical assets of the user.

When the ATF needs to implement switching between the REE and the TEE, the ATF may write an entrance address of the TEE into a return address register of the TEE, read the address from the return address register of the TEE, and switch to the TEE based on the address, so that code corresponding to the address and subsequent code start to be executed in the TEE. In the foregoing switching process, if the hacker breaks through the ATF, the hacker may write an invalid entrance address into the return address register of the TEE through the ATF. Consequently, transferring from code of the ATF to any code in the TEE for execution is performed based on the invalid entrance address. For example, after switching to the TEE is performed, the TEE skips some critical security verification steps, and directly returns a verification success result to the REE.

Further, in a normal case, the ATF may access a memory of the ATF (used to store data and code of the ATF) based on a page table of the ATF, in other words, the page table of the ATF may be mapped to the memory of the ATF. In the page table of the ATF, a physical address recorded in a page table entry of the ATF points to the memory of the ATF. If the ATF is attacked by a hacker, the hacker may maliciously tamper, through the ATF, with the physical address recorded in the page table entry of the ATF, to enable the address recorded in the page table entry of the ATF to point to the memory of the TEE (used to store data and code of the TEE). In this way, the hacker may access the memory of the TEE through the ATF based on a modified page table of the ATF, and steal or tamper with the data and the code of the TEE.

Further, the hacker may further write an invalid base address into a page table base address register of the ATF through the ATF. In this way, after reading the invalid base address from the page table base address register of the ATF, the ATF obtains, based on the base address, a page table newly created by the hacker. Because a physical address recorded in a page table entry in the page table maliciously created by the hacker usually points to the memory of the TEE, the hacker may also steal or tamper with the data and the code of the TEE in this attack manner.

Therefore, to prevent the hacker from maliciously accessing the TEE through the ATF, an embodiment of the present disclosure provides a method for switching an execution environment, so that the ATF can implement a brand new security mechanism, and a security defense capability of the ATF is improved. The new security mechanism includes a process in an initialization phase and a process in which a service is invoked. The following first describes the process in the initialization phase. It should be noted that the REE, the ATF, and the TEE mentioned in embodiments of the present disclosure are all software concepts, and all the three are running modes of a processor. Therefore, during physical implementation, steps performed by the REE, the ATF, and the TEE may all be considered as being performed by the processor. FIG. 2 is a schematic flowchart of a method for switching an execution environment according to an embodiment of the present disclosure. As shown in FIG. 2, the method includes the following steps.

201: ATF disables an MMU.

After a processor is enabled, the ATF may be initialized. A process of initializing the ATF includes setting a virtual address range of the ATF, constructing a page table of the ATF, writing a base address of the page table of the ATF into a page table base address register of the ATF, enabling the MMU, setting access permission for a data segment and a code segment of the ATF, and the like.

After the ATF is initialized, the MMU is disabled. When the MMU is in an enabled state, if the ATF forcibly modifies the page table of the ATF, for example, modifies access permission for a page table entry of the ATF, or modifies the access permission for the data segment or the code segment of the ATF, a system crashes. Therefore, the ATF needs to first disable the MMU to smoothly perform subsequent steps.

202: The ATF reads the base address of the page table of the ATF from the page table base address register of the ATF, and obtains a page table directory of the ATF based on the base address of the page table of the ATF, where the page table directory of the ATF records a one-to-one correspondence between a plurality of virtual addresses of the ATF and physical addresses of a plurality of page table entries of the ATF, and for any page table entry of the ATF, the page table entry records a data segment of the ATF and access permission for the data segment, or the page table entry records a physical address of a code segment of the ATF and access permission for the code segment, or the page table entry records access permission for the plurality of page table entries of the ATF, or the page table entry does not record content.

In this embodiment, a memory of the ATF is divided into a plurality of memory areas. One memory area of the ATF may be used to store the page table directory of the ATF, the page table entry of the ATF, the data segment of the ATF, the code segment of the ATF, or the like. In addition, one memory area of the ATF has a dedicated physical address. The ATF may find the corresponding memory area based on the physical address, so as to perform an operation on, for example, read, write, or execute, an object stored in the memory area. It should be noted that, the memory area of the ATF may be a dedicated memory area of the ATF (where the area is dedicated for use by the ATF), may be a shared memory area between the ATF and a TEE (where the area may be used by the ATF and the TEE together), or may be a shared memory area between the ATF and an REE (where the area may be used by the ATF and the REE together).

It may be understood that, because a specific physical address points to a specific memory area, and the memory area stores a corresponding object, "a physical address of a specific object" described below may be considered as a physical address that points to a memory area storing the object. For example, a physical address of the page table directory of the ATF points to a memory area storing the page table directory of the ATF. For another example, a physical address of the code segment of the ATF points to a memory area storing the code segment of the ATF.

The page table of the ATF is a two-level structure, and includes the page table directory of the ATF and the plurality of page table entries of the ATF. The physical address of the page table directory of the ATF is the base address of the page table of the ATF. The page table directory of the ATF records the one-to-one correspondence between the plurality of virtual addresses of the ATF and the physical addresses of the plurality of page table entries of the ATF. Each virtual address of the ATF is in the virtual address range allocated to the ATF, and a physical address of each page table entry of the ATF points to a memory area used to store the page table entry.

The plurality of page table entries of the ATF may be classified into two types of page table entries: a used page table entry and an unused page table entry. When a specific page table entry of the ATF is a used page table entry, the page table entry records a physical address of a data segment of the ATF and access permission for the data segment, the page table entry records a physical address of a code segment of the ATF and access permission for the code segment, or the page table entry records the access permission for the plurality of page table entries of the ATF. When a specific page table entry of the ATF is an unused page table entry, the page table entry does not record any content, in other words, content recorded in the page table entry is empty. In addition, the access permission for the page table entry of the ATF includes read and write, the access permission for the data segment of the ATF includes read and write, and the access permission for the code segment of the ATF includes read, write, and execute.

In conclusion, based on the page table of the ATF, the following correspondence may be implemented: the virtual address of the ATF→the physical address of the page table entry of the ATF→the physical address of the data segment of the ATF or the physical address of the code segment of the ATF. The foregoing correspondence may also be equivalent to the following correspondence: the virtual address of the ATF→the page table entry of the ATF→the data segment of the ATF or the code segment of the ATF. Therefore, the ATF may obtain the corresponding data segment of the ATF or the corresponding code segment of the ATF based on the virtual address of the ATF.

If the ATF needs to modify the page table of the ATF, for example, modify the page table directory of the ATF or modify the page table entry of the ATF, the ATF may first read the base address of the page table of the ATF from the page table base address register of the ATF, and then obtain the page table directory of the ATF from a memory area to which the base address points.

203: The ATF obtains a second virtual address, and determines, in the page table directory of the ATF, a physical address of a second page table entry corresponding to the second virtual address, where the second virtual address is one of the plurality of virtual addresses of the ATF, and the second page table entry records the access permission for the plurality of page table entries of the ATF.

204: The ATF obtains the second page table entry based on the physical address of the second page table entry, and modifies, in the second page table entry, the access permission for the plurality of page table entries of the ATF to read-only.

After obtaining the page table directory of the ATF, the ATF may modify the access permission for the page table entries of the ATF. The ATF may obtain the second virtual address used to modify the access permission for the page table entries of the ATF, determine, in the page table directory of the ATF, the physical address of the second page table entry corresponding to the second virtual address, and then obtain the second page table entry from a memory area to which the physical address of the second page table entry points, where the second page table entry records the access permission for all the page table entries of the ATF. It may be understood that, in the page table of the ATF, the second virtual address is one of the plurality of virtual addresses of the ATF. Therefore, the second page table entry is also one of the plurality of page table entries of the ATF.

Then, the ATF may modify, in the second page table entry, the access permission for each page table entry of the ATF to read-only. Therefore, content recorded in each page table entry of the ATF can only be read but cannot be modified. For example, it is assumed that a specific page table entry of the ATF records a physical address of a specific code segment of the ATF and access permission for the code segment. If access permission for the page table entry of the ATF is set to read-only, the ATF can only read content recorded in the page table entry, but cannot modify the content recorded in the page table entry, to be specific, cannot modify the physical address and the access permission for the code segment that are recorded in the page table entry.

205: The ATF obtains a third virtual address, and determines, in the page table directory of the ATF, a physical address of a third page table entry corresponding to the third virtual address, where the third virtual address is one of the plurality of virtual addresses of the ATF.

206: The ATF obtains the third page table entry based on the physical address of the third page table entry, and sets access permission for a target code segment recorded in the third page table entry to non-execute, where the target code segment recorded in the third page table entry indicates a modification operation of the page table base address register of the ATF and a disabling operation of the MMU.

After obtaining the page table directory of the ATF, the ATF may further modify the access permission for the target code segment that indicates sensitive instructions. The sensitive instructions include the modification operation of the page table base address register of the ATF and the disabling operation of the MMU. The ATF may first obtain the third virtual address corresponding to the target code segment, determine, in the page table directory of the ATF, the physical address of the third page table entry corresponding to the third virtual address, and then obtain the third page table entry from a memory area to which the physical address of the third page table entry points. It may be understood that, in the page table of the ATF, the third virtual address is one of the plurality of virtual addresses of the ATF. Therefore, the third page table entry is also one of the plurality of page entries of the ATF, and the target code is one of a plurality of code segments of the ATF.

After the ATF obtains the third page table entry, because the third page table entry records a physical address of the target code segment and the access permission for the target code segment, the ATF may change the access permission for the target code segment in the third page table entry to non-execute, that is, the ATF does not execute the sensitive instructions anymore, to be specific, the ATF cannot write a new base address into the page table base address register of the ATF anymore, and cannot disable the MMU anymore.

It should be understood that step 203 and step 205 are not performed in sequence. Step 203 and step 205 may be performed at the same time, or may be performed at different time. For example, step 203 is performed before step 205. For another example, step 203 is performed after step 205. This is not limited herein.

207: The ATF enables the MMU.

After the ATF modifies the page table of the ATF, the ATF may restart the MMU. By now, the process in the initialization phase is completed.

In this embodiment, after the ATF restarts the MMU, even if a hacker breaks through the ATF, because the MMU cannot be disabled anymore, the hacker cannot modify the access permission for the page table entry of the ATF through the ATF. Moreover, the access permission for the page table entry of the ATF is locked to read-only, and the hacker cannot modify, through the ATF, the physical address recorded in the page table entry of the ATF, and cannot enable the physical address recorded in the page table entry of the ATF to point to a memory of the TEE. Further, the hacker cannot write an invalid base address into the page table base address register of the ATF through the ATF, cannot enable the ATF to obtain, based on the invalid base address, a page table maliciously created by the hacker, and cannot access the memory of the TEE based on the page table. Therefore, after the ATF performs a series of permission settings on the page table of the ATF, a security defense capability of the ATF can be effectively improved, and a case in which the hacker maliciously accesses the TEE through the ATF can be prevented.

After the process in the initialization phase is completed, if the REE initiates invoking of a secure service to the TEE, the process in which the service is invoked may be started. FIG. 3 is another schematic flowchart of a method for switching an execution environment according to an embodiment of the present disclosure. As shown in FIG. 3, the method includes the following steps.

301: ATF receives a switching request from an REE.

If the REE initiates invoking of a security service to a TEE, that is, switching from the REE to the TEE needs to be performed, the REE may send the switching request to the ATF.

302: The ATF writes a first virtual address into a return address register of the TEE based on the switching request, and writes a base address of a page table of the TEE into a page table base address register of the TEE.

After receiving the switching request from the REE, the ATF may determine that switching between the REE and the TEE needs to be performed. Therefore, the ATF may write the first virtual address into the return address register of the TEE, and write the base address of the page table of the TEE into the page table base address register of the TEE.

In addition, before the ATF writes the first virtual address and the base address of the page table of the TEE into the return address register of the TEE and the page table base address register of the TEE respectively, the ATF may modify a value of a system control register, to enable the ATF to be in an interrupt disable state, thereby providing atomic protection for subsequent steps, so as to prevent the subsequent steps from being interrupted by an interrupt event.

303: If the ATF determines, in the return address register of the TEE and the page table base address register of the TEE, that both the first virtual address and the base address of the page table of the TEE are within a preset valid address range, the ATF reads the first virtual address from the return address register of the TEE.

Before the ATF writes the first virtual address and the base address of the page table of the TEE into the return address register of the TEE and the page table base address register of the TEE respectively, if a hacker breaks through the ATF, the hacker may change the first virtual address to be written by the ATF to an invalid entrance address. Consequently, the ATF writes the invalid entrance address into the return address register of the TEE, and transferring to any code in the TEE for execution is performed based on the invalid address. Further, even if the first virtual address is a valid entrance address, the ATF needs to use a correct page table of the TEE in a process of jumping to the TEE based on the first virtual address. If the base address that is of the page table of the TEE and that is written by the ATF into the page table base address register of the TEE is an invalid address, the ATF cannot obtain the correct page table of the TEE, and consequently, the jump fails. Further, the TEE cannot obtain the correct page table of the TEE subsequently, and consequently, a series of security problems occur in a system.

It can be learned that, the ATF does not determine whether the addresses written by the ATF to the return address register of the TEE and the page table base address register of the TEE are valid addresses. Therefore, the ATF needs to detect the addresses that are in the two registers, and determine whether the addresses in the two registers are within the preset valid address range, so as to avoid the foregoing situation. It should be noted that the preset valid address range includes at least one valid entrance address and a unique correct base address of the page table of the TEE. For example, if the preset valid address range includes a unique valid entrance address, the ATF can switch to the TEE based only on the unique entrance address, so that unique specified code and subsequent code start to be executed in the TEE. For another example, if the preset valid address range includes a plurality of entrance addresses of the TEE, the ATF may switch to the TEE based on one of the plurality of entrance addresses, so that one of a plurality of pieces of specified code, and subsequent code start to be executed in the TEE.

When the ATF determines that both the first virtual address and the base address of the page table of the TEE are within the preset valid address range, in other words, the ATF determines that the first virtual address is a valid entrance address, and the base address of the page table of the TEE is also a correct address, the ATF may read the first virtual address from the return address register of the TEE.

304: The ATF reads the base address of the page table of the TEE from the page table base address register of the TEE, and obtains a page table directory of the TEE based on the base address of the page table of the TEE, where the page table directory of the TEE records a one-to-one correspondence between a plurality of virtual addresses of the TEE and physical addresses of a plurality of page table entries of the TEE, and for any page table entry of the TEE, the page table entry records a physical address of a data segment of the TEE, or the page table entry records a physical address of a code segment of the TEE, or the page table entry does not record content.

After reading the first virtual address, the ATF reads the base address of the page table of the TEE from the page table base address register of the TEE, and obtains the page table directory of the TEE based on the base address of the page table of the TEE. It should be noted that for related descriptions of the page table of the TEE, refer to the related descriptions of the page table of the ATF in step 202.

305: The ATF determines, in the page table directory of the TEE, a physical address of a first page table entry corresponding to the first virtual address, where the first virtual address is one of the plurality of virtual addresses of the TEE.

After the ATF obtains the page table directory of the TEE, because the page table directory of the TEE records the one-to-one correspondence between the plurality of virtual addresses of the TEE and the physical addresses of the plurality of page entries of the TEE, the ATF may determine, in the page table directory of the TEE, the physical address of the first page table entry corresponding to the first virtual address. In the page table of the TEE, the first virtual address is one of the plurality of virtual addresses of the TEE. Therefore, the first page table entry is one of the plurality of page table entries of the TEE.

306: The ATF obtains the first page table entry based on the physical address of the first page table entry, and determines the physical address recorded in the first page table entry.

After obtaining the physical address of the first page table entry, the ATF obtains the first page table entry from a memory area to which the physical address of the first page table entry points, and determines the physical address recorded in the first page table entry.

307: The ATF switches to the TEE based on the physical address recorded in the first page table entry.

The first page table entry records a physical address of a specific code segment of the TEE, and the code segment is a code segment specified in advance. Therefore, the ATF may switch to the TEE based on the physical address recorded in the first page table entry, so that the code segment corresponding to the physical address and subsequent code start to be executed in the TEE.

In this embodiment, after receiving the switching request of the REE, the ATF may obtain the first virtual address used to enter the TEE. Because the first virtual address is within the preset valid address range, in other words, a value of the first virtual address can be obtained only within the preset valid address range, the ATF switches to the TEE based on the first virtual address whose value is limited, so that code only at a specific location and subsequent code start to be executed in the TEE, and it is equivalent to that the ATF can enter the TEE only from a specific entrance or some specific entrances. This can effectively prevent a hacker from maliciously accessing the TEE through the ATF.

In addition, in the process in which the service is invoked, if a switching request sent by the REE in some special service scenarios indicates the ATF to extend memory access permission for the ATF (for example, to enable the ATF to additionally access a new shared memory area in addition to a memory area that can be currently accessed by the ATF), because permission for a page table entry of the ATF is locked to read-only, the page table of the ATF cannot be modified to extend the memory access permission for the ATF. In this embodiment of the present disclosure, the TEE may modify the page table of the TEE to extend the memory access permission for the ATF. The following describes a process in which the TEE extends the memory access permission for the ATF. FIG. 4 is still another schematic flowchart of a method for switching an execution environment according to an embodiment of the present disclosure. As shown in FIG. 4, the method includes the following steps.

401: A TEE receives a switching request from ATF, where the switching request indicates the ATF to add a correspondence between a fourth virtual address and a destination physical address, the fourth virtual address is one of a plurality of virtual addresses of the ATF, and the destination physical address points to a new shared memory area between the ATF and the TEE.

Before the ATF is switched to the TEE, the ATF may store the switching request in a shared memory area (an allocated shared memory area) between the ATF and the TEE. After switching to the TEE is performed, the TEE may obtain the switching request from the shared memory area. The switching request indicates the ATF to add the correspondence between the fourth virtual address and the destination physical address to a page table of the ATF. The fourth virtual address is one of the plurality of virtual addresses of the ATF, and a fourth page table entry (one of a plurality of page table entries of the ATF) corresponding to the fourth virtual address is usually an unused page table entry, that is, the page table entry does not record any content. It should be noted that the destination physical address points to the new shared memory area (a shared memory area to be allocated) between the ATF and the TEE. Therefore, the TEE may determine, based on the switching request, that memory access permission for the ATF needs to be extended.

402: The TEE determines, in a page table directory of the ATF based on the switching request, a physical address of the fourth page table entry corresponding to the fourth virtual address.

After determining that the memory access permission for the ATF needs to be extended, the TEE may parse out the fourth virtual address from the switching request. Then, the TEE obtains the page table directory of the ATF, and determines, in the page table directory of the ATF, the physical address of the fourth page table entry corresponding to the fourth virtual address.

403: The TEE obtains a fifth virtual address, where the fifth virtual address is one of a plurality of virtual addresses of the TEE.

After the physical address of the fourth page table entry is determined, the TEE may obtain the fifth virtual address. The fifth virtual address is one of the plurality of virtual addresses of the TEE, and a fifth page table entry (one of a plurality of page table entries of the TEE) corresponding to the fifth virtual address is usually an unused page table entry, that is, the page table entry does not record any content.

404: The TEE determines, in a page table directory of the TEE, a physical address of the fifth page table entry corresponding to the fifth virtual address, and obtains the fifth page table entry based on the physical address of the fifth page table entry.

After obtaining the fifth virtual address, the TEE determines, in the page table directory of the TEE, the physical address of the fifth page table entry corresponding to the fifth virtual address, and obtains the fifth page table entry from a storage area to which the physical address of the fifth page table entry points.

405: The TEE modifies content recorded in the fifth page table entry to the physical address of the fourth page table entry.

In a page table of the TEE, after obtaining the fifth page table entry, the TEE may modify the fifth page table entry. The TEE may modify the content recorded in the fifth page table entry to the physical address of the fourth page table entry and access permission for the fourth page table entry. Generally, the access permission that is for the fourth page table entry and that is recorded in the fifth page table entry is read and write. In this case, the TEE establishes the following correspondence in the page table of the TEE: the fifth virtual address→the fifth page table entry→the fourth page table entry.

406: The TEE obtains the fourth page table entry based on the fifth virtual address.

After completing modification of the fifth page table entry, the TEE may obtain the fourth page table entry based on the fifth virtual address. The TEE first obtains the page table directory of the TEE. Then, the TEE determines, in the page table directory of the TEE, the physical address of the fifth page table entry corresponding to the fifth virtual address, and obtains the fifth page table entry from the memory area to which the physical address of the fifth page table entry points. Then, the TEE determines the physical address that is of the fourth page table entry and that is recorded in the fifth page table entry, and obtains the fourth page table entry from a memory area to which the physical address of the fourth page table entry points.

407: The TEE modifies content recorded in the fourth page entry to the destination physical address.

After obtaining the fourth page table entry, the TEE modifies the content recorded in the fourth page table entry to the destination physical address. In this case, the TEE establishes the following correspondence in the page table of the TEE: the fifth virtual address→the fifth page table entry→the fourth page table entry→the new shared memory area. This is equivalent to updating a correspondence in the page table of the ATF to the following correspondence: the fourth virtual address→the fourth page table entry→the new shared memory area (where the original correspondence is: the fourth virtual address→the fourth page table entry).

408: The TEE deletes the content recorded in the fifth page table entry.

After updating the correspondence in the page table of the ATF, the TEE may delete the content recorded in the fifth page table entry, in other words, remove the following correspondence: the fifth virtual address→the fifth page table entry→the fourth page table entry→the new shared memory area, so that the page table of the TEE is restored to a state that is before modification, and the page table of the ATF still remains in a state that is after modification. Therefore, the TEE may serve as a proxy to replace the ATF to extend the memory access permission for the ATF, so that the solution is more comprehensive.

Figure 5:
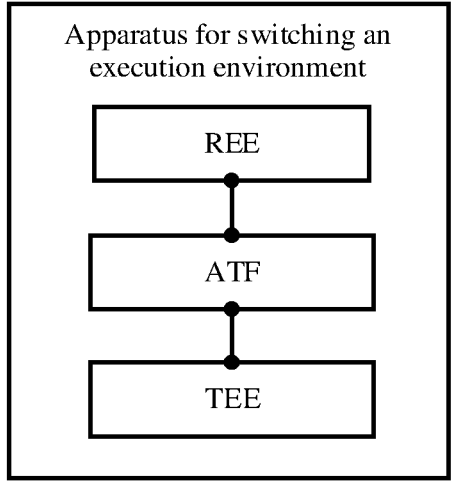
FIG. 5 is a schematic diagram of a structure of an apparatus for switching an execution environment according to an embodiment of the present disclosure.

The foregoing describes the methods for switching an execution environment provided in embodiments of the present disclosure. The following describes apparatuses for switching an execution environment provided in embodiments of the present disclosure. FIG. 5 is a schematic diagram of a structure of an apparatus for switching an execution environment according to an embodiment of the present disclosure. As shown in FIG. 5, the apparatus includes an REE, ATF, and a TEE. The ATF is configured to: receive a switching request from the REE; write a first virtual address into a return address register of the TEE based on the switching request; read the first virtual address from the return address register of the TEE if the ATF determines that the first virtual address in the return address register of the TEE is within a valid address range; and switch to the TEE based on the first virtual address.

In a possible implementation, the ATF is further configured to write a base address of a page table of the TEE into a page table base address register of the TEE. The ATF is further configured to: if determining, in the return address register of the TEE and the page table base address register of the TEE, that both the first virtual address and the base address of the page table of the TEE are within the preset valid address range, read the first virtual address from the return address register of the TEE.

In a possible implementation, the ATF is further configured to: read the base address of the page table of the TEE from the page table base address register of the TEE, and obtain a page table directory of the TEE based on the base address of the page table of the TEE, where the page table directory of the TEE records a one-to-one correspondence between a plurality of virtual addresses of the TEE and physical addresses of a plurality of page table entries of the TEE, and for any page table entry of the TEE, the page table entry records a physical address of a data segment of the TEE, or the page table entry records a physical address of a code segment of the TEE, or the page table entry does not record content; determine, in the page table directory of the TEE, a physical address of a first page table entry corresponding to the first virtual address, where the first virtual address is one of the plurality of virtual addresses of the TEE; obtain the first page table entry based on the physical address of the first page table entry, and determine the physical address recorded in the first page table entry; and switch to the TEE based on the physical address recorded in the first page table entry.

In a possible implementation, if the switching request indicates the ATF to add a correspondence between a fourth virtual address and a destination physical address, where the fourth virtual address is one of a plurality of virtual addresses of the ATF, and the destination physical address points to a new shared memory area between the ATF and the TEE, the TEE is configured to: receive the switching request from the ATF; determine, in a page table directory of the ATF based on the switching request, a physical address of a fourth page table entry corresponding to the fourth virtual address; obtain a fifth virtual address, and determine, in the page table directory of the TEE, a physical address of a fifth page table entry corresponding to the fifth virtual address, where the fifth virtual address is one of the plurality of virtual addresses of the TEE; obtain the fifth page table entry based on the physical address of the fifth page table entry, and modify content recorded in the fifth page table entry to the physical address of the fourth page table entry; obtain the fourth page table entry based on the fifth virtual address; and modify content recorded in the fourth page table entry to the destination physical address.

In a possible implementation, the ATF is further configured to modify a value of a system control register, to enable the ATF to be in an interrupt disable state.

In a possible implementation, the TEE is further configured to delete the content recorded in the fifth page table entry.

In addition, the present disclosure further provides another embodiment of an apparatus for switching an execution environment. The apparatus includes ATF, and the ATF is configured to: disable an MMU; read a base address of a page table of the ATF from a page table base address register of the ATF, and obtain a page table directory of the ATF based on the base address of the page table of the ATF, where the page table directory of the ATF records a one-to-one correspondence between a plurality of virtual addresses of the ATF and physical addresses of a plurality of page table entries of the ATF, and for any page table entry of the ATF, the page table entry records a data segment of the ATF and access permission for the data segment, or the page table entry records a physical address of a code segment of the ATF and access permission for the code segment, or the page table entry records access permission for the plurality of page table entries of the ATF, or the page table entry does not record content; obtain a second virtual address, and determine, in the page table directory of the ATF, a physical address of a second page table entry corresponding to the second virtual address, where the second virtual address is one of the plurality of virtual addresses of the ATF, and the second page table entry records the access permission for the plurality of page table entries of the ATF; obtain a second page table entry based on the physical address of the second page table entry, and modify, in the second page table entry, the access permission for the plurality of page table entries of the ATF to read-only; obtain a third virtual address, and determine, in the page table directory of the ATF, a physical address of a third page table entry corresponding to the third virtual address, where the third virtual address is one of the plurality of virtual addresses of the ATF; obtain the third page table entry based on the physical address of the third page table entry, and set access permission for a target code segment recorded in the third page table entry to non-execute, where the target code segment indicates a modification operation of the page table base address register of the ATF and a disabling operation of the MMU; and enable the MMU.

It should be noted that content such as information exchange between the modules/units of the apparatus and the execution processes thereof is based on the same idea as that of the method embodiments of the present disclosure, and produces the same technical effects as that of the method embodiments of the present disclosure. For specific content, refer to the foregoing descriptions in the method embodiments of the present disclosure.

Figure 6:
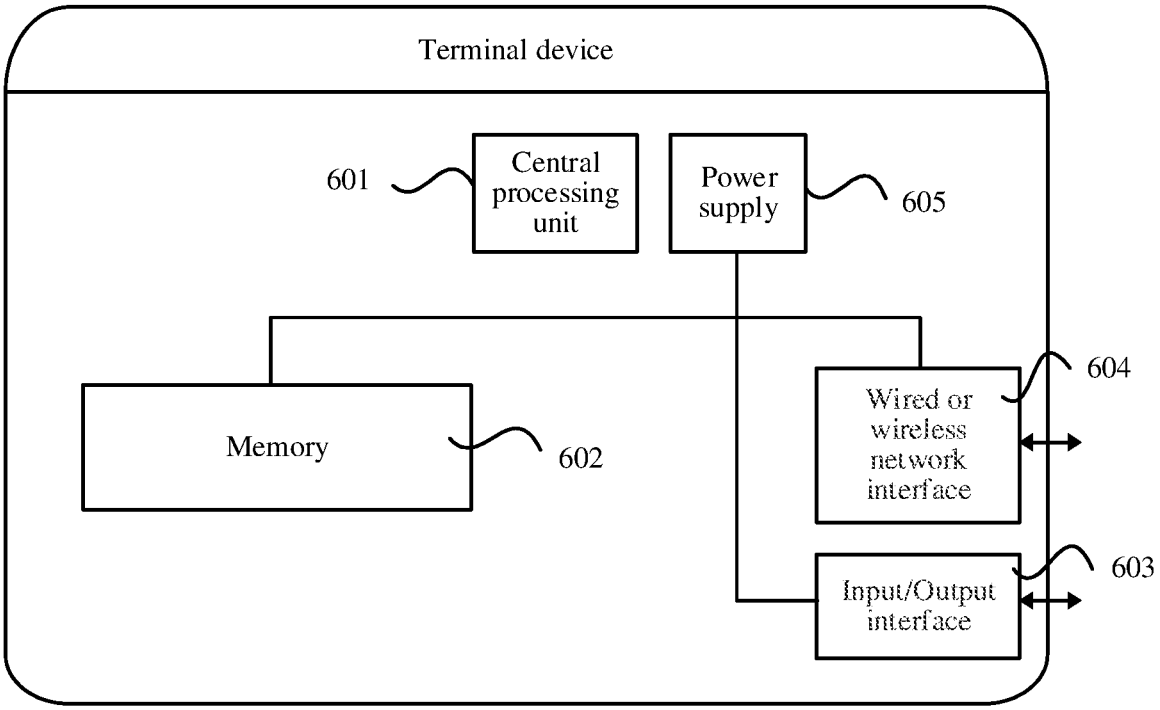
FIG. 6 is a schematic diagram of a structure of a terminal device according to an embodiment of the present disclosure.

FIG. 6 is a schematic diagram of a structure of a terminal device according to an embodiment of the present disclosure. As shown in FIG. 6, an embodiment of a terminal device in embodiments of the present disclosure may include one or more central processing units 601, a memory 602, an input/output interface 603, a wired or wireless network interface 604, and a power supply 605.

The memory 602 may perform transient storage or persistent storage. Further, the central processing unit 601 may be configured to communicate with the memory 602, and perform, on the terminal device, a series of instruction operations in the memory 602.

In this embodiment, the central processing unit 601 may perform the operations performed by the ATF or the TEE in embodiments shown in FIG. 2 to FIG. 4.

In this embodiment, division of specific functional modules in the central processing unit 601 may be similar to division of modules such as the REE, the ATF, and the TEE described in FIG. 5.

An embodiment of the present disclosure further relates to a computer storage medium, including computer-readable instructions. When the computer-readable instructions are executed, the method steps performed by the ATF or the TEE in FIG. 2 to FIG. 4 are implemented.

An embodiment of the present disclosure further relates to a computer program product including instructions. When the computer program product runs on a computer, the computer is enabled to perform method steps performed by the ATF or the TEE in FIG. 2 to FIG. 4.

It may be clearly understood by a person skilled in the art that, for the purpose of convenient and brief description, for a detailed working process of the foregoing systems, apparatuses, and units, refer to a corresponding process in the foregoing method embodiments.

In the several embodiments provided in the present disclosure, it should be understood that the disclosed systems, apparatuses, and methods may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of the present disclosure may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of the present disclosure essentially, or the part contributing to a conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in embodiments of the present disclosure. The storage medium includes any medium that can store program code, such as a USB flash drive, a removable hard disk, a read-only memory (ROM), a random access memory (RAM), a magnetic disk, or an optical disc.

What is claimed is:

1. A method for switching an execution environment, comprising:

receiving, by ARM trusted firmware (ATF), a switching request from a rich execution environment (REE);

writing, by the ATF, a first virtual address into a return address register of a trusted execution environment (TEE) based on the switching request;

writing, by the ATF, a base address of a page table of the TEE into a page table base address register of the TEE;

reading, by the ATF, the first virtual address from the return address register of the TEE when the ATF determines that the first virtual address in the return address register of the TEE is within a valid address range;

reading, by the ATF, the base address of the page table of the TEE from the page table base address register of the TEE, and obtaining a page table directory of the TEE based on the base address of the page table of the TEE, the page table directory recording a one-to-one correspondence between a plurality of virtual addresses of the TEE and physical addresses of a plurality of page table entries of the TEE;

determining, by the ATF in the page table directory of the TEE, a physical address of a first page table entry corresponding to the first virtual address, wherein the first virtual address is one of the plurality of virtual addresses of the TEE;

obtaining, by the ATF, the first page table entry based on the physical address of the first page table entry, and determining the physical address recorded in the first page table entry; and switching, by the ATF, to the TEE based on the physical address recorded in the first page table entry.

2. The method according to claim 1, the reading, by the ATF, the first virtual address from the return address register of the TEE when the ATF determines that the first virtual address in the return address register of the TEE is within a valid address range comprises:

when the ATF determines, in the return address register of the TEE and the page table base address register of the TEE, that both the first virtual address and the base address of the page table of the TEE are within the valid address range, reading, by the ATF, the first virtual address from the return address register of the TEE.

3. The method according to claim 2, wherein for any page table entry of the TEE, the page table entry records a physical address of a data segment of the TEE, or the page table entry records a physical address of a code segment of the TEE, or the page table entry does not record content.

4. The method according to claim 3, wherein when the switching request indicates the ATF to add a correspondence between a fourth virtual address and a destination physical address, wherein the fourth virtual address is one of a plurality of virtual addresses of the ATF, and the destination physical address points to a Previously Presented shared memory area between the ATF and the TEE, after the switching, by the ATF, to the TEE based on the first virtual address, the method further comprises:

receiving, by the TEE, the switching request from the ATF;

determining, by the TEE in a page table directory of the ATF based on the switching request, a physical address of a fourth page table entry corresponding to the fourth virtual address, wherein the page table directory of the ATF records a one-to-one correspondence between the plurality of virtual addresses of the ATF and physical addresses of a plurality of page table entries of the ATF;

obtaining, by the TEE, a fifth virtual address, and determining, in the page table directory of the TEE, a physical address of a fifth page table entry corresponding to the fifth virtual address, wherein the fifth virtual address is one of the plurality of virtual addresses of the TEE;

obtaining, by the TEE, the fifth page table entry based on the physical address of the fifth page table entry, and modifying content recorded in the fifth page table entry to the physical address of the fourth page table entry;

obtaining, by the TEE, the fourth page table entry based on the fifth virtual address; and modifying, by the TEE, content recorded in the fourth page table entry to the destination physical address.

5. The method according to claim 2, wherein before the writing, by the ATF, a first virtual address into a return address register of a TEE, the method further comprises:

modifying, by the ATF, a value of a system control register, to enable the ATF to be in an interrupt disable state.

6. The method according to claim 4, wherein after the modifying, by the TEE, content recorded in the fourth page table entry to the destination physical address, the method further comprises:

deleting, by the TEE, the content recorded in the fifth page table entry.

7. An apparatus for switching an execution environment, comprising a rich execution environment (REE), ARM trusted firmware (ATF), and a trusted execution environment (TEE), wherein the ATF is configured to:

receive a switching request from the REE;

write a first virtual address into a return address register of the TEE based on the switching request;

write a base address of a page table of the TEE into a page table base address register of the TEE;

read the first virtual address from the return address register of the TEE when the ATF determines that the first virtual address in the return address register of the TEE is within a valid address range;

read the base address of the page table of the TEE from the page table base address register of the TEE, and obtain a page table directory of the TEE based on the base address of the page table of the TEE, wherein the page table directory of the TEE records a one-to-one correspondence between a plurality of virtual addresses of the TEE and physical addresses of a plurality of page table entries of the TEE;

determine, in the page table directory of the TEE, a physical address of a first page table entry corresponding to the first virtual address, wherein the first virtual address is one of the plurality of virtual addresses of the TEE;

obtain the first page table entry based on the physical address of the first page table entry, and determine the physical address recorded in the first page table entry; and switch to the TEE based on the physical address recorded in the first page table entry.

8. The apparatus according to claim 7, wherein the ATF is further configured to: when determining, in the return address register of the TEE and the page table base address register of the TEE, that both the first virtual address and the base address of the page table of the TEE are within the valid address range, read the first virtual address from the return address register of the TEE.

9. The apparatus according to claim 8, wherein for any page table entry of the TEE, the page table entry records a physical address of a data segment of the TEE, or the page table entry records a physical address of a code segment of the TEE, or the page table entry does not record content.

10. The apparatus according to claim 9, wherein when the switching request indicates the ATF to add a correspondence between a fourth virtual address and a destination physical address, wherein the fourth virtual address is one of a plurality of virtual addresses of the ATF, and the destination physical address points to a Previously Presented shared memory area between the ATF and the TEE, the TEE is configured to:

receive the switching request from the ATF;

determine, in a page table directory of the ATF based on the switching request, a physical address of a fourth page table entry corresponding to the fourth virtual address, wherein the page table directory of the ATF records a one-to-one correspondence between the plurality of virtual addresses of the ATF and physical addresses of a plurality of page table entries of the ATF;

obtain a fifth virtual address, and determine, in the page table directory of the TEE, a physical address of a fifth page table entry corresponding to the fifth virtual address, wherein the fifth virtual address is one of the plurality of virtual addresses of the TEE;

obtain the fifth page table entry based on the physical address of the fifth page table entry, and modify content recorded in the fifth page table entry to the physical address of the fourth page table entry;

obtain the fourth page table entry based on the fifth virtual address; and modify content recorded in the fourth page table entry to the destination physical address.

11. The apparatus according to claim 8, wherein the ATF is further configured to modify a value of a system control register, to enable the ATF to be in an interrupt disable state.

12. The apparatus according to claim 10, wherein the TEE is further configured to delete the content recorded in the fifth page table entry.

\* \* \* \* \*